United States Patent [19]

Schwendinger

[11] Patent Number: 5,463,748
[45] Date of Patent: Oct. 31, 1995

[54] INSTRUCTION BUFFER FOR ALIGNING INSTRUCTION SETS USING BOUNDARY DETECTION

[75] Inventor: Greg Schwendinger, Santa Clara, Calif.

[73] Assignee: Intel Corporation, Santa Clara, Calif.

[21] Appl. No.: 85,637

[22] Filed: Jun. 30, 1993

[51] Int. Cl.⁶ ..................................................... G06F 13/00
[52] U.S. Cl. .................... 395/375; 395/250; 364/DIG. 1; 364/DIG. 2
[58] Field of Search ............................. 364/238.6, 284.1, 364/284.2; 395/250, 375

[56] References Cited

U.S. PATENT DOCUMENTS

| | | | |
|---|---|---|---|
| 4,521,850 | 6/1985 | Wilhite et al. | 395/250 |
| 4,635,194 | 1/1987 | Burger et al. | 395/250 |
| 4,755,935 | 7/1988 | Davis et al. | 395/250 |
| 4,953,121 | 8/1990 | Muller | 395/375 |
| 5,185,868 | 2/1993 | Tran | 395/375 |

OTHER PUBLICATIONS

Micro. Architecture of the VAX 9000 by, John E. Murray et al, IEEE Publication, 1990 pp. 44–53.

*Primary Examiner*—Parshotam S. Lall
*Assistant Examiner*—Zarni Maung
*Attorney, Agent, or Firm*—Blakely, Sokoloff, Taylor & Zafman

[57] ABSTRACT

An instruction buffer for outputting instructions is described which includes a first storage area having four storage elements, and a second storage area having three storage elements. The first storage area initially inputs four instructions. The first storage area is able to output one, two, three, or four instructions for any given cycle. The instruction buffer detects the number of instructions outputted, and shifts the remaining instructions in the first and second storage areas into the vacancy formed by the outputted instructions. The instruction buffer determines, based on the sensed number, whether four additional instructions should be loaded into the second and first storage areas. Upon a determination that the second and first storage areas should be loaded, the four instructions are loaded into the second and first storage areas.

5 Claims, 6 Drawing Sheets

INSTRUCTION BUFFER FOR ALIGNING INSTRUCTION SETS USING BOUNDARY DETECTION

FIELD OF THE INVENTION

The present invention relates to mechanisms for sequentially transferring instruction sets from an instruction buffer to an instruction decoder.

BACKGROUND OF THE INVENTION

The operation of an instruction buffer is to transfer instructions from a computer memory to an instruction decoder. As is known in the prior art, a computer memory may store a block of instructions. Segments of the block of instructions are transferred to a cache memory, as needed, and the cache memory in turn sequentially transfers the instructions to the instruction buffer.

The instruction buffer buffers the instructions from the cache memory to the instruction decoder. In this way, the cache memory is allowed operational versatility in that it does not have to perform hand-shaking operations with the instruction decoder. For example, the cache memory may be ready to send four instructions to the instruction decoder, but the instruction decoder may not be ready to receive the four instructions. The instruction buffer takes the instructions from the cache memory and holds the instructions for the instruction decoder until the instruction decoder is ready to receive the instructions.

FIG. 1 shows a conventional instruction buffer configuration wherein instructions are fed, one at a time, from a memory 101 to instruction buffer 103 (or, alternatively, directly to the four-to-one multiplexer 109). With each cycle, instruction buffer 103 may receive one instruction from memory 101, and address buffer 104 may receive the corresponding address. If instruction buffer 103 already has an instruction before it is to receive a second instruction from memory 101, then that first instruction is fed to instruction buffer 105 (and the corresponding address in address buffer 104 is fed to address buffer 106), before instruction buffer 103 and address buffer 104 receive the second instruction and address from memory 101.

In the same way that the first instruction is shifted down from instruction buffer 103 upon receipt of a second instruction, a third instruction fed to instruction buffer 103 may cause the second instruction to shift to instruction buffer 105 and the first instruction to shift to instruction buffer 107.

Instruction buffer 107 is connected at its output to the four-to-one multiplexer 109, as are instruction buffers 103 and 105 at their respective outputs. Line 102 connects memory 101 directly to the four-to-one multiplexer 109, such that instructions may by-pass the three instruction buffers 103, 105, and 107 altogether. When the three instruction buffers are not by-passed with line 102, the four-to-one multiplexer 109 sequentially selects instructions from the three instruction buffers 103, 105, and 107 in the same order as they were fed from memory 101. The four-to-one multiplexer 109 outputs instructions to instruction decoder 111, one at a time.

The configuration of FIG. 1 has several drawbacks. For instance, the system is only able to provide a single instruction to instruction decoder 111 for any given cycle. Also, the speed of the system is severely limited because of the bottleneck created at the memory 101 and instruction buffer 103 interface. That is, when the three instruction buffers are not by-passed, memory 101 can only feed instructions to the instruction buffer configuration as fast as instruction buffer 103 can accept the instructions which is at a speed of one instruction per cycle.

SUMMARY OF THE INVENTION

The present invention provides more versatility than the prior art in that it is able to accept from memory four instructions per cycle instead of just one, and is able to output instructions to an instruction decoder in combinations or one, two, three, or four instructions per cycle. The instruction buffer of the present invention includes a first storage area having four storage elements and a second storage area having three storage elements, for a total of seven storage elements. The first storage area initially inputs four instructions, and is configured to output one, two, three, or four instructions for any given cycle. The instruction buffer of the present invention is actually able to output up to seven instructions per cycle, but is optimized in the preferred embodiment to output up to four. In the case of seven, for example, four instructions would come from the first storage area and three instructions would come from the second storage area.

When a number of instructions (between one and four) are output from the first storage area, a number of vacancies equal to the number of instructions output is formed. The instruction buffer senses the number of instructions remaining, and shifts those remaining instructions in the first and second storage areas into the vacancies formed by the outputted instructions. The instruction buffer then determines, based on the sensed number, whether four additional instructions should be loaded into the second and first storage areas. This determination is based on whether the total number of instructions remaining, since the last loading of the second and first storage areas with four additional instructions, is less than or equal to three.

Upon a determination that the total number of instructions remaining since the last loading of the second and first storage areas is less than or equal to three, a determination is made that the second and first storage areas should be loaded with four additional instructions. Accordingly, four additional instructions are loaded into the second and first storage areas.

DETAILED DESCRIPTION OF THE INVENTION

An instruction buffer memory for issuing instruction sets to an instruction decoder will now be described. In the following description, numerous specific details are set forth such as bit lengths, bus widths, etc., in order to provide a thorough understanding of the present invention. It will be evident, however, to those skilled in the art that these specific details need not be used to practice the present invention. In other instances, well-known structures and circuits have not been shown in detail in order to avoid unnecessarily obscuring the present invention.

Figure 1:
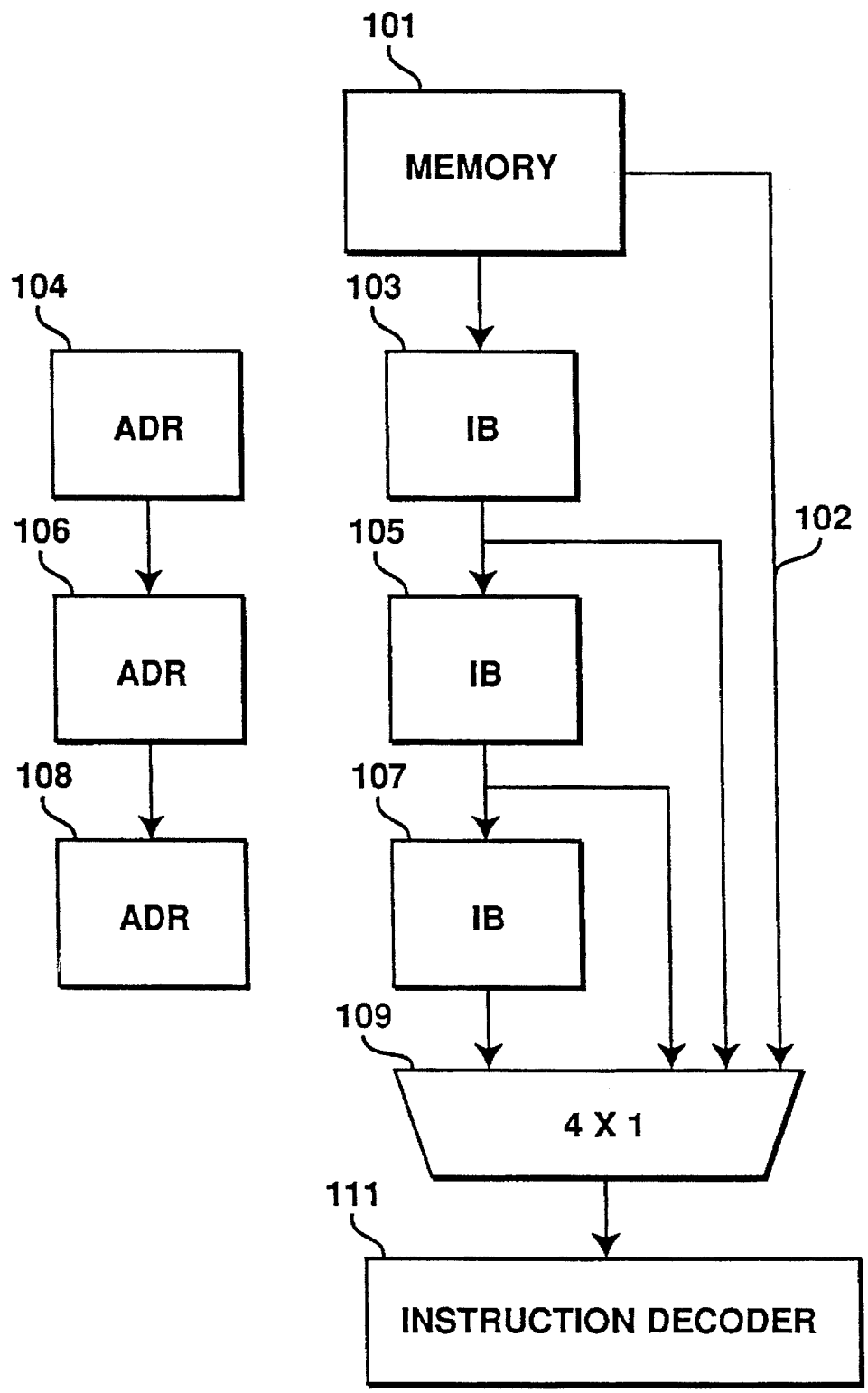
FIG. 1 is a block diagram of a first instruction buffer configuration, according to the prior art.
Figure 2:
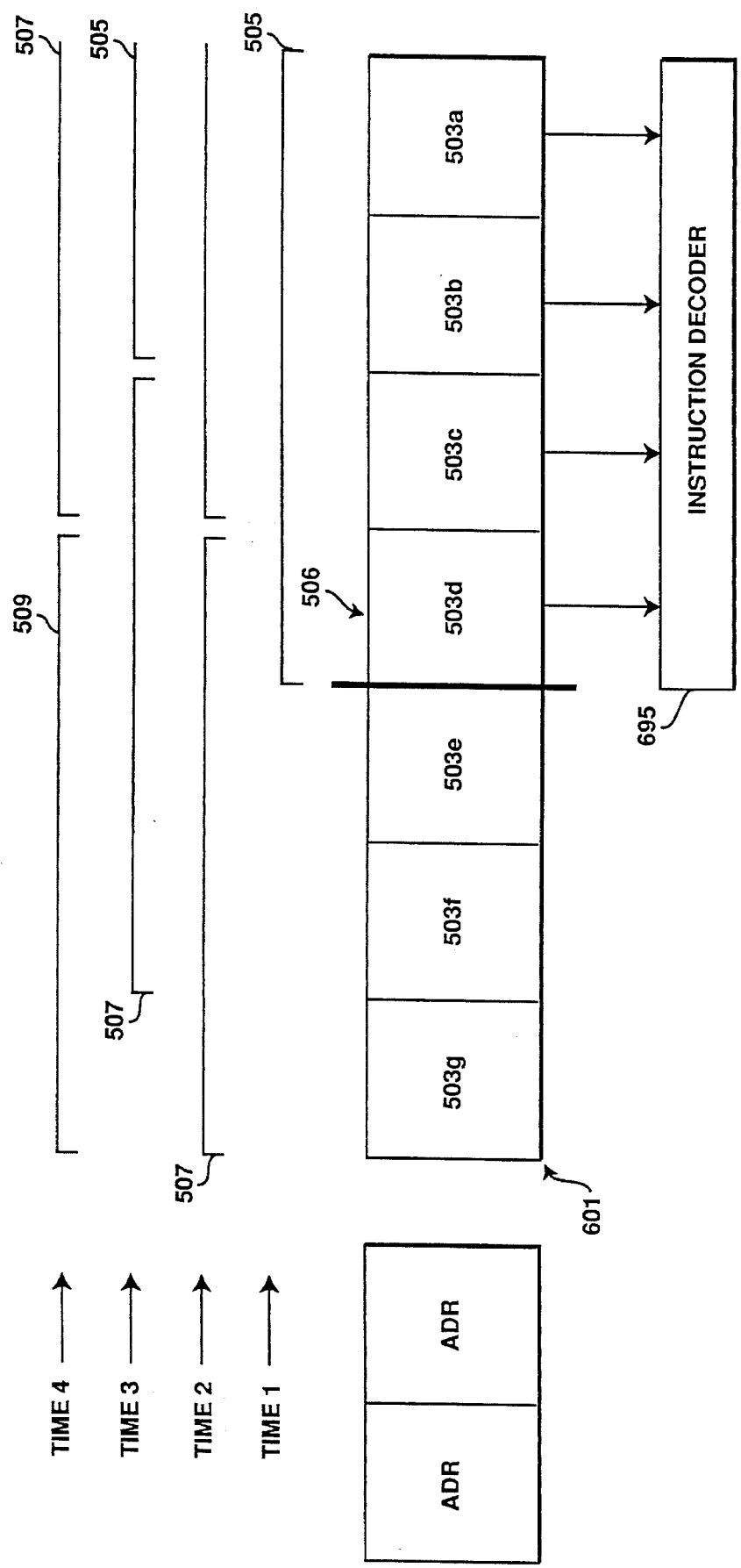
FIG. 2 is a schematic diagram showing the boundary between two sets of four instructions, according to the presently preferred embodiment.

Turning to FIG. 2, a schematic diagram of the concept of the presently preferred embodiment is shown. The instruction buffer of the present invention can be viewed as a shift register. The shift register 601 in FIG. 2 comprises seven storage elements labeled 503a–g, respectively. Storage elements 503a–d can be viewed as a first storage area, and storage elements 503e–g can be viewed as a second storage area. At "time 1" a set of four instructions is initially input into storage elements 503a, 503b, 503c and 503d, in that order. The input of the four instructions is shown at bracket 505.

Each of the four instructions in their respective storage elements is assigned a two bit address code. For example, the first instruction in element 503a is assigned a binary value "00"; the second instruction in element 503b is assigned a binary value of "01"; the third instruction in element 503c is assigned a binary value "10"; the fourth instruction in element 503d is assigned a binary value of "11."

Instruction decoder 695 receives instructions from the four storage elements in combinations of one, two, three or four. Instructions are issued from instruction buffer 601 from right to left. Thus, generally, a single instruction issued from instruction buffer 601 would be issued from storage element 503a, and three instructions would be issued from storage elements 503a, 503b and 503c, in that order. This, however, is not always the case. As will be described later, if the specific fetch address corresponds to storage element 503b, then storage element 503a will be treated as a vacancy. In this case, where 503a is vacant and 503b–d are not vacant, a single instruction would be issued form storage element 503b, and, alternatively, three instructions would be issued from storage elements 503b, 503c and 503d, in that order.

Taking the case where a single instruction is issued from instruction buffer 601 during a cycle at "time 2," after that instruction issues a vacancy can be viewed as having been formed in storage element 503a. The instruction buffer senses this vacancy and shifts the three remaining elements one storage element to the right. This shift, in turn, forms a vacancy in storage element 503d. Since elements 503e–g have not received any instructions, a four storage element vacancy is formed by storage elements 503d–g.

The four storage element vacancy is filled by an input set of four instructions into instruction buffer 601. The four instructions are input into storage elements 503d, 503e, 503f and 503g, in that order, and are assigned two bit address codes "00," "01," "10", and "11," respectively. This input of the four instructions is shown with bracket 507 at "time 2" in FIG. 2.

At this point, it is noted that each instruction of each set of four instructions is always assigned a two bit address code upon input. These two bit address codes are used by state machine 691, when, for any reason, the address of a corresponding instruction is to be reconstructed.

The instruction buffer 601 uses a pointer 506 for boundary detection (keeping track of boundaries between respective sets of four instructions). Initially, the pointer 506 points to the last instruction of the first set of four instructions. Thus, at "time 1" the pointer 506 points to storage element 503d. At "time 2" the pointer 506 points to storage element 503c.

At "time 3," suppose that a single instruction is again output from storage element 503a. A vacancy is thus formed in storage element 503a. The instruction buffer 601 senses this vacancy and shifts the six remaining instructions in the instruction buffer 601 one storage element to the right. This shift, in turn, forms a vacancy in storage element 503g, but a single vacancy obviously does not provide enough room to input another set of four instructions. The pointer 506 of the instruction buffer 601 now points to storage element 503b.

As mentioned, initially the pointer 506 points the last instruction of the first set of four instructions. When this last instruction is issued, the pointer 506 points to the last instruction of a second set of four instructions, if any. If a second set of four instructions is not input to the instruction buffer 601, or if the last instruction of the second set of four instructions is issued at the same time that the last instruction of the first set of four instructions is issued, then the pointer 506 will point to the last instruction of any instructions input to the instruction buffer 601.

In the presently preferred embodiment, where only up to two sets of four instructions may exist in the instruction buffer 601 at a time, the boundary detection allows the instruction buffer 601 to ensure that only that maximum of two sets exist in the buffer at a time. As embodied herein, this function is met by determining if there are instructions past (to the left of) the pointer 506. Additionally, there is a valid bit associated with each of the seven storage elements 503a–g. As a set of four instructions enters the instruction buffer 601, it will be treated as valid if its valid bit is set, and will be treated as a vacancy if its valid bit is not set.

Continuing with the example of FIG. 2, at "time 4" suppose that three instructions are issued from storage elements 503a, 503b and 503c. The three instructions in 503d, 503e and 503f (503g is vacant) are then shifted three storage elements to the right, as shown in FIG. 2 at "time 4." A four storage element vacancy is thus created. The instruction buffer 601 determines that a four storage element vacancy exists for input of a set of four instructions, if: (1) the four valid bits of the four storage elements which form the four element vacancy are not set; and (2) there is only one set of four instructions in the instruction buffer 601. The latter requirement stems from the fact that, in the preferred embodiment, only two sets of instructions may be in the instruction buffer 601 at a given time. Of course, the present invention may be configured to operate with a larger number.

Thus, in the example, at "time 4" the instruction buffer 601 detects that the valid bits of storage elements 503d–g are not set, and detects that only one set of four instructions exist since there are no valid instructions below (to the left of) the pointer 506 (which is at storage element 503c). The instruction buffer 601 then inputs a new set of four instructions into storage elements 503d–g. The new set of four instructions is shown at 509.

Figure 3:
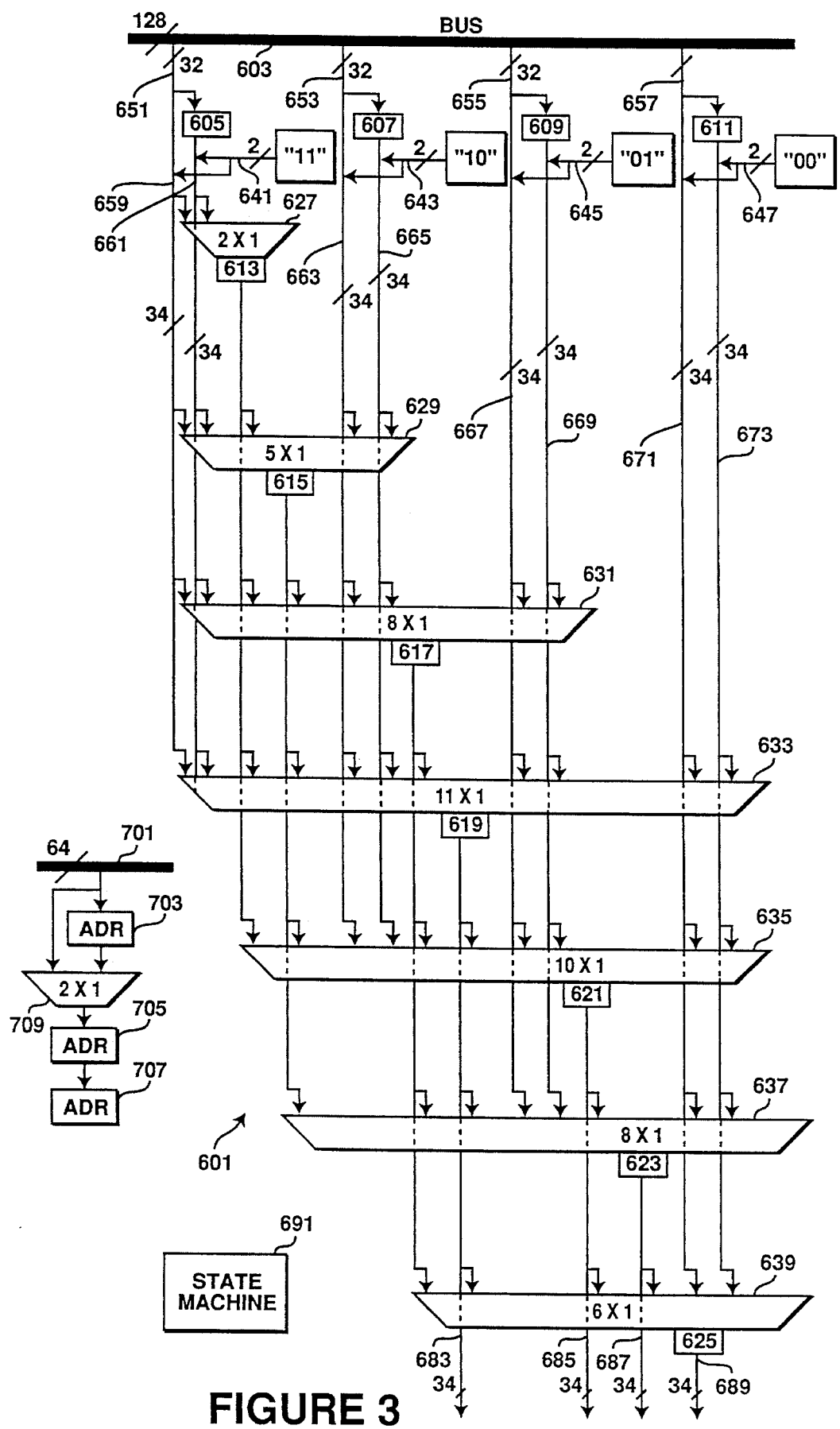
FIG. 3 is a block diagram showing the instruction buffer of the presently preferred embodiment.

An implementation of the instruction buffer of the presently preferred embodiment is shown in FIG. 3, having a bus 603 which carries a set of four instructions to the instruction buffer 601. Each of the four instructions on bus 603 is 32 bits in length, and is fed onto one of the 32 bit lines 651, 653, 655, and 657, respectively. For example, the first instruction is placed on line 657; the second instruction is placed on line 655; the third instruction is placed on line 653; and the fourth instruction is placed on line 651. Lines 651, 653, 655, and 657 are connected to 32 bit latches 605, 607, 609, and 611, respectively. The outputs of latches 605, 607, 609, and 611, as well as lines 651, 653, 655, and 657, are hardwired to lines 641, 643, 645, and 647, respectively, through which they are assigned respective two bit address codes. For example, a two bit address code equal to "11" is fed on line 641 to line 651 and to the output of latch 605. Similarly, a two bit address code of "10" is fed on line 643 to the output of latch 607 and to line 653; a two bit address code of "01" is fed on line 645 to the output of latch 609 and to line 655; and a two bit address code of "00" is fed on line 647 to the output of latch 611 and to line 657.

The present invention includes first and second storage areas. As embodied herein, the first storage area comprises multiplexers 633, 635, 637, 639, and latches 619, 621, 623, 625. The second storage area comprises multiplexers 627, 629, 631, and latches 613, 615, 617. The output of each multiplexer is fed into the corresponding latch of that respective multiplexer. The two-to-one multiplexer 627 receives as input lines 659 and 661, and outputs a 34 bit value into latch 613. The five-to-one multiplexer 629 selects from line 659, line 661, the output of latch 613, line 663, and line 665. The five-to-one multiplexer 629 outputs a 34 bit value into latch 615.

The eight-to-one multiplexer 631 selects from the eight 34 bit lines 659, 661, output from latch 613, output from latch 615, 663, 665, 667, and 669. Latch 617 receives the output from the eight-to-one multiplexer 631. The eleven-to-one multiplexer 633 receives eleven 34 bit inputs and outputs a 34 bit number into latch 619. The eleven inputs of multiplexer 633 are the outputs from latches 613, 615, 617, and lines 659, 661, 663, 665, 667, 669, 671, and 673.

The ten-to-one multiplexer 635 selects from the latch outputs of latches 613, 615, 617, 619, and from lines 663, 665, 667, 669, 671, and 673. The output of the ten-to-one multiplexer 635 is fed to latch 621. The eight-to-one multiplexer 637 outputs a 34 bit value to latch 623, and receives inputs from latches 615, 617, 619, 621, and lines 667, 669, 671, and 673. Finally, the six-to-one multiplexer 639 outputs a thirty-four bit value into latch 625, after selecting that value from latches 617, 619, 621, 623, and lines 671, 673.

Figure 6:
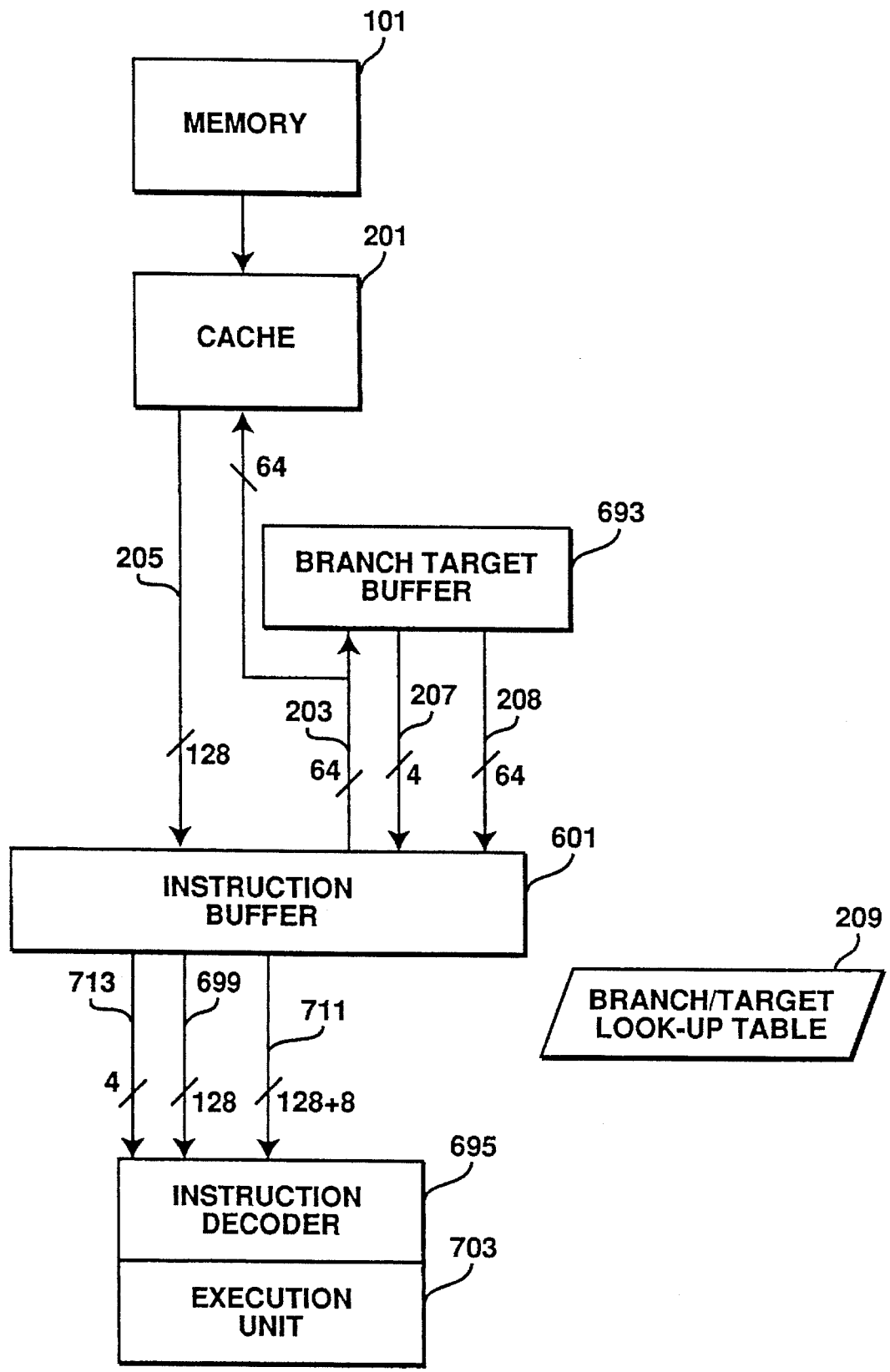
FIG. 6 is a block diagram of the overall system architecture which shows how the instruction buffer of the presently preferred embodiment is connected to other elements of the system.

The four outputs of the instruction buffer 601 are lines 683, 685, 687, and 689, which are fed from latches 619, 621, 623, and 625, respectively. These four outputs 683, 685, 687, and 689 are fed to an instruction decoder 695, as shown in FIG. 6. A state machine 691 controls the operation of the multiplexers, of the latches, and of the enables (which instruct the instruction and address buffers when to latch new information), as described below.

The operation of the instruction buffer 601 is similar to the operation described above with reference to FIG. 2. Initially, a set of four 32 bit instructions is fed from bus 603 to lines 651, 653, 655, and 657. The first instruction on line 657 is then assigned the two bit address code "00" from line 647, and is then fed directly to multiplexer 639 via line 671. The 32 bit instruction on line 655 is assigned a two bit address code of "01" from line 645, and is then fed directly to multiplexer 637 via line 667. Similarly, the third and fourth instructions are assigned two bit address codes of "10" and "11", respectively, and are fed to multiplexers 635 and 633, respectively.

The four multiplexers 639, 637, 635, and 633 select these four instructions and output them into corresponding latches 625, 623, 621, and 619. Thus, output lines 689, 687, 685, and 683 are ready for instruction decoder 695 to input their values. Instruction decoder 695 is able to select one, two, three, or four of the instructions during a given cycle.

As in the example described with reference to FIG. 2, if only the one instruction on line 689 is issued to instruction decoder 695, an effective shift occurs. After the first instruction is issued from latch 625, the six-to-one multiplexer 639 selects the second instruction from latch 623 and outputs that instruction to latch 625; the eight-to-one multiplexer 637 selects the third instruction from latch 621 and outputs that instruction to latch 623; and the ten-to-one multiplexer 635 selects the fourth instruction from latch 619 and outputs that instruction to latch 621. Whereas before the first, second, third, and fourth instructions were on lines 689, 687, 685, and 683, respectively, now the second, third, and fourth instructions are on lines 689, 687, and 685, respectively. Line 683 (which is the output of latch 619) is now "vacant" as are the outputs of latches 617, 615, and 613.

With the three latches 625, 623, and 621 filled, and with latches 619, 617, 615, and 613 vacant, a new set of four instructions may now be accepted. Depending on latency periods, the four new instruction may already be in latches 611, 609, 607, and 605, or may be directly input on lines 671, 667, 663, and 659. Assuming the former to be the case, the four instruction are assigned their respective two bit address codes of "00", "01", "10", and "11". The first, second, third, and fourth instructions with their two bit address codes are then selected by multiplexers 633, 631, 629, and 627, respectively. This operation corresponds to the description of "time 2," which was described above with reference to FIG. 2.

If instruction decoder 695 again selects only a single instruction from line 689, the values in latches 613, 615, 617, 619, 621, and 623, are shifted to latches 615, 617, 619, 621, 623, and 625. Multiplexer 639 selects the value from latch 623; multiplexer 637 selects the value from latch 621; multiplexer 635 selects the value from latch 619; multiplexer 633 selects the value from latch 617; multiplexer 631 selects the value from latch 615; and multiplexer 629 selects the value from latch 613. This operation causes a vacancy in latch 613 which, as mentioned in the description of "time 3" with reference to FIG. 2, is not sufficient for a new set of four instructions.

Assuming that the instruction decoder 695 selects three instructions from lines 689, 687, and 685, the instructions in latches 619, 617, and 615 are shifted to latches 625, 623, and 621. Four vacancies are thus created in latches 619, 617, 615, and 613, and a new set of four instructions can then be input thereto.

An address bus 701 delivers a sixty-four bit address for each set of four instructions that are fed to the instruction buffer 601. In the presently preferred embodiment, a maximum of two sets of four instructions can be delivered into the seven latches 613, 615, 617, 619, 621, 623, and 625. Thus, two address buffers 705 and 707 are needed—one for the beginning address of each set of four instructions. A third address buffer 703 is for the beginning address of a set of four instructions input to buffers 605, 607, 609, and 611.

The seven latches 613, 615, 617, 619, 621, 623, and 625 of the presently preferred embodiment may be configured to accept instructions from more than just two sets of four instructions. For example, in the case of configuring the seven latches 613, 615, 617, 619, 621, 623, and 625 to accept instructions from up to three sets of four instructions, an additional address buffer (not shown) would be appended below address buffer 707, thus totaling three address buffers for the potential three sets of four instructions (excluding address buffer 703, which is for a set of four instructions for the four buffers 605, 607, 609, and 611).

The need to implement this configuration having the extra address buffer may arise, for example, where: one instruction is left in latch 625 of a first set of four (i.e., three instructions were issued); a second set of four instructions is input to latches 623, 621, 619, 617; and only two instructions from a third set of four is input to latches 615 and 613. The operation of effectively inputting fewer than four instructions into the instruction buffer 601 is discussed later with reference to FIG. 6. Because of this ability to input fewer than four instructions, it is possible to input up to seven instructions, each instruction being from a different set of four instructions, into the seven latches 613, 615, 617, 619, 621, 623, and 625. In this case, five address buffers would be needed below address buffer 707 (making a total of seven address buffers for the seven latches 613, 615, 617, 619, 621, 623, and 625—one for the beginning address of each set of four addresses).

In the presently preferred embodiment, each of the two address buffers 705 and 707 holds the address of the first instruction of a corresponding set of four instructions. For example, address buffer 705 may hold the address of the first instruction in a set of four. This first instruction is input on line 657, where it is then assigned the two bit address code "00" from line 647. Similarly, the second instruction in the set of four is assigned the two bit address code "01," the third instruction in the set of four is assigned the two bit address code "10," and the fourth instruction in the set of four is assigned the two bit address code "11." This assignment of two bit address codes allows the present invention to use a single address buffer for each set of four instructions, since only the bottom two bits differ between the addresses of the four instructions. Without the two bit address codes, an address buffer would be needed for each instruction, instead of for each instruction set.

As previously mentioned, the four buffers 605, 607, 609, and 611 may accept a set of four instructions if there are not a sufficient number of vacancies in the seven latches 613, 615, 617, 619, 621, 623, and 625. The address buffer 703 is only used when the buffers 605, 607, 609, and 611 are used. Thus, when buffers 605, 607, 609, and 611 are not used, addresses are fed directly to address buffer 705 via a two-to-one multiplexer 709. When a new set of four instructions enters into the seven latches 613, 615, 617, 619, 621, 623, and 625, the address in address buffer 705 moves to address buffer 707 and the address of the new set of four instructions is fed to address buffer 705.

Figure 4:
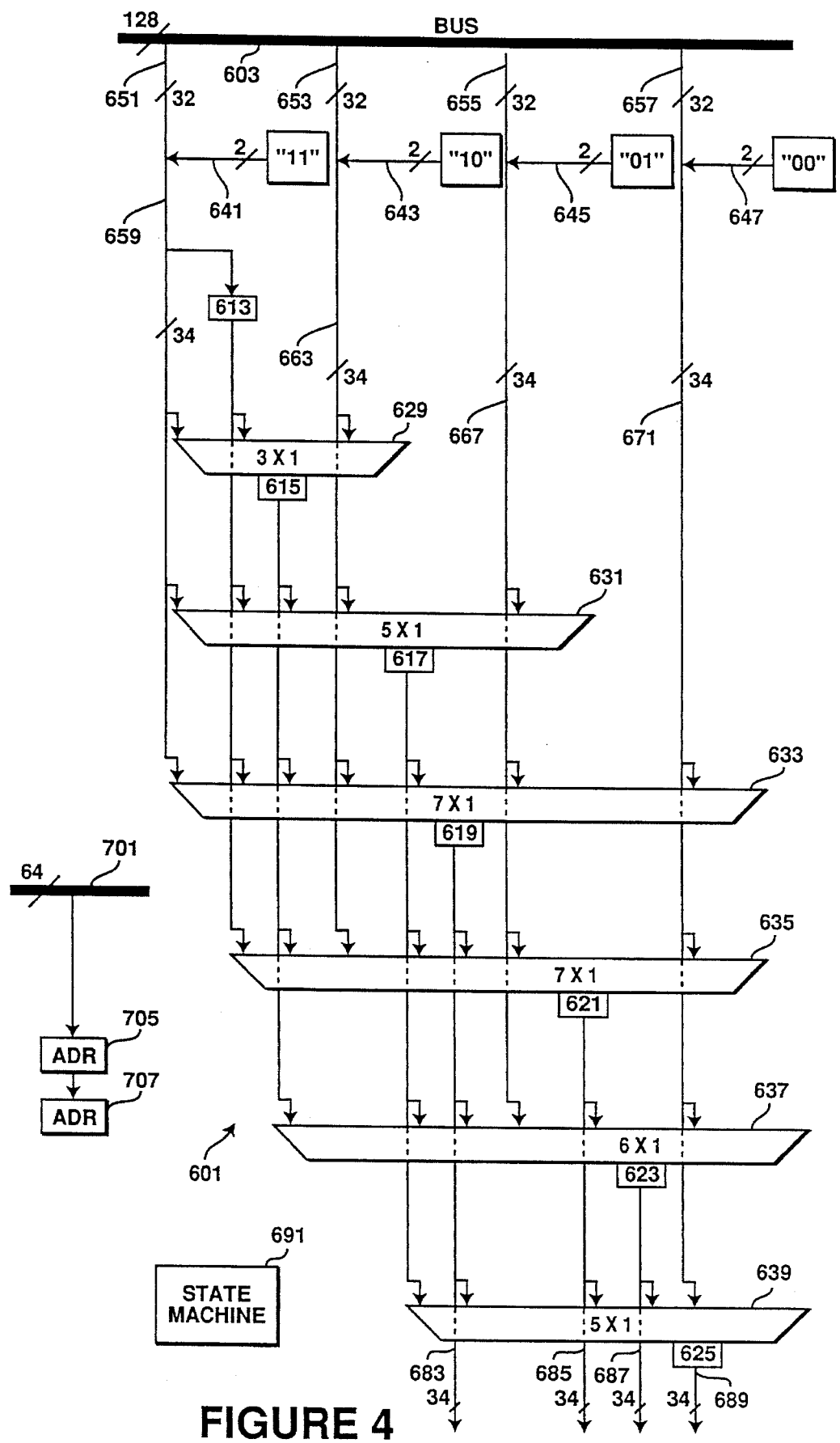
FIG. 4 is a block diagram showing the instruction buffer according to a second presently preferred embodiment.
Figure 5:
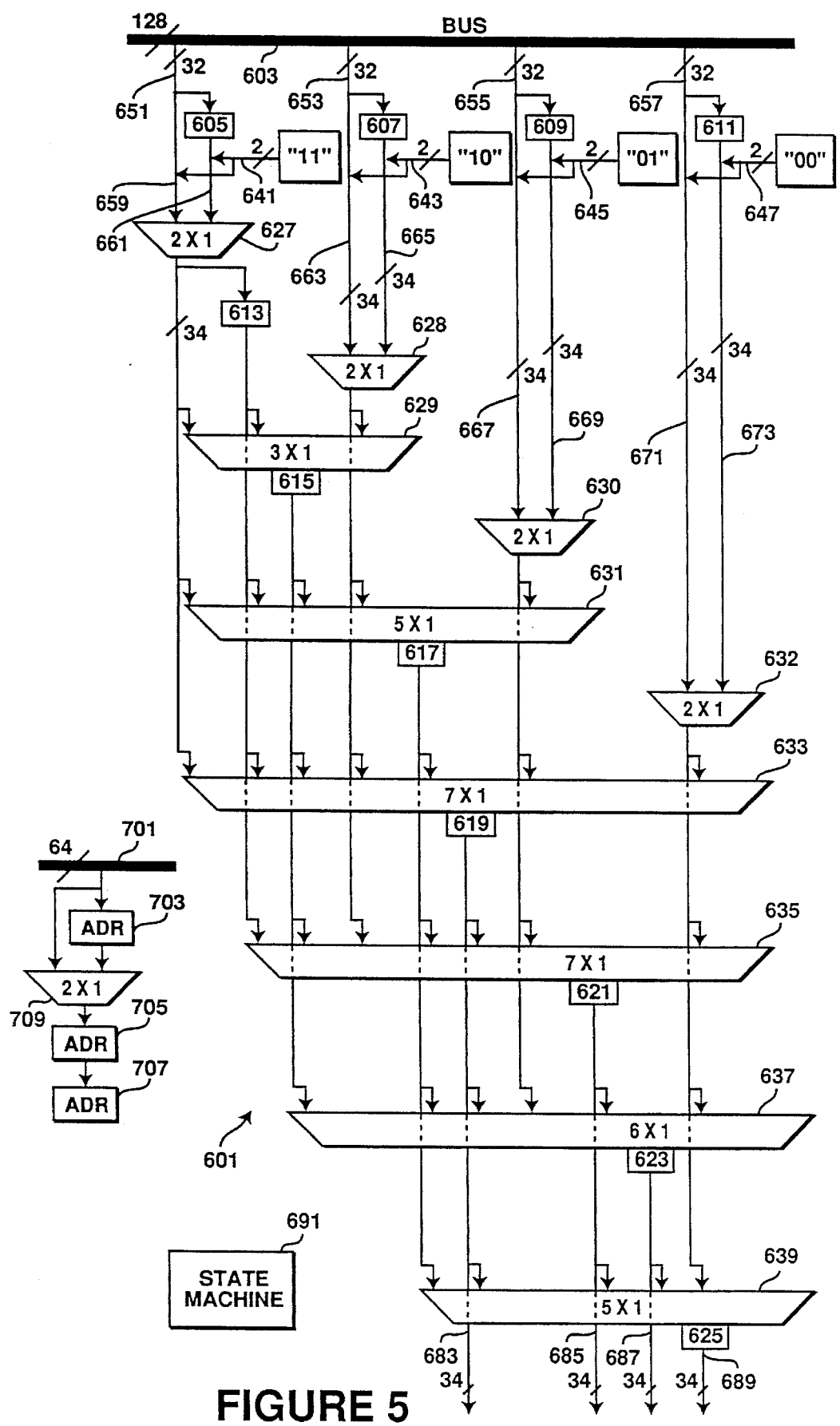
FIG. 5 is a block diagram showing the instruction buffer according to a third presently preferred embodiment.

FIGS. 4 and 5 depict two presently preferred embodiments, both which are similar to FIG. 3. Basically, FIG. 4 is the configuration of FIG. 3 without the four latches 605, 607, 609, and 611. FIG. 5 is configured with three additional multiplexers 628, 630, and 632. The four two-to-one multiplexers 627, 628, 630, and 632 select from their corresponding inputs and output their selections to corresponding multiplexers as shown. These four two-to-one multiplexers 627, 628, 630, and 632 operate together. Thus, the four two-to-one multiplexers 627, 628, 630, and 632 select lines 659, 663, 667, and 671, respectively, when instructions are not in the four latches 605, 607, 609, and 611. When instructions are in the four latches 605, 607, 609, and 611, the four two-to-one multiplexers 627, 628, 630, and 632 select those latches, respectively.

Looking now at FIG. 6, a system using the instruction buffer 601 of the present invention is now described. A memory 101 feeds segments of instructions to cache 201, which feeds sets of four instructions to instruction buffer 601 via bus 603.

In operation, the instruction buffer 601 sends via the sixty-four bit line 203 a "general fetch address," which corresponds to a "specific fetch address," to the cache memory 201. The general fetch address instructs the cache memory 201 as to which starting address to select a set of four instructions. In the presently preferred embodiment, the lower two bits in the sixty-four bit general fetch address are "00," since the cache memory 201 need only select the set of four instructions beginning with that general fetch address. Thus, the two bit address codes "00," "01," "10," and "11" of FIG. 3 correspond to the lower two bits of the addresses of four instructions in a set of four instructions which was selected with a general fetch address ending with "00."

Upon receipt of the set of four instructions via line 205, the instruction buffer 601 determines whether the specific fetch address (without the two lower bits set to "00") corresponds to the first, second, third, or fourth instruction in the set of four instructions. If the specific fetch address ends with "00" then the first instruction and those following (second, third, and fourth) are kept. If the specific fetch address ends with "01" then the second instruction in the set of four is the specific fetch address, and that instruction and those following (third and fourth) are kept, while the first instruction is discarded. If the specific fetch address ends with "10" then the third instruction in the set of four is the specific fetch address, and that instruction and the fourth instruction are kept, while the first and second instructions are discarded. If the specific fetch address ends with "11" then only the fourth instruction is kept, and the preceding three instructions are discarded.

Positioned between the cache memory 201 and the instruction buffer 601 is a branch target buffer 693. The branch target buffer 693 receives via line 203 the general fetch address from the instruction buffer 601. Generally, the branch target buffer 693 looks for potential "jump" and "target" instructions, and notifies the instruction buffer 601 of any such instructions. (A first set of four instructions may contain an instruction to "jump" to a target instruction, and another set of four instructions may contain the target instruction.)

In order to predict jump instructions, the branch target buffer 693 compares the address of each instruction in the set of four with addresses in a branch/target look-up table 209. The look-up table contains addresses of previously executed jump instructions. If an address of one of the four instructions matches one of the addresses in the look-up table, then a first prediction is made that the instruction corresponding to that address is a jump. A second prediction of whether the jump instruction will be taken is also made (because jumps are usually conditional). If a jump instruction which is predicted taken is disregarded, then, of course, the corresponding prediction that the jump instruction will be taken is also disregarded.

The branch target buffer 693 notifies via line 207 the instruction buffer 601 of any predicted jump instructions that are predicted to be taken. In the presently preferred embodiment, each bit of the four bit line 207 corresponds to one of the set of four instructions, and is placed high to indicate a predicted jump instruction and placed low to indicate the absence of a predicted jump instruction. To predict a target instruction once a jump instruction is predicted, the branch target buffer 693 locates the address corresponding to the jump instruction in the look-up table 209. The branch target buffer 693 sends via line 208 the predicted target address to the instruction buffer 601.

As an example, assume the branch target buffer 693 predicts a jump instruction in a first set of four instructions, and instructs the instruction buffer 601 to disregard any instructions immediately following the "jump" instruction in the first set of four instructions. Thus, if the "jump" instruction is the second instruction in the first set of four instructions, the instruction buffer will disregard the third and fourth instructions in the first set of four instructions (i.e., treat them as vacancies). Here, the first two instructions are placed in latches 625 and 623, for example, and the third and fourth instructions in latches 621 and 619 are treated as vacancies. Consequently, a second set of four instructions may be fed into the four latches 621, 619, 617, and 615; whereas latches 621 and 619 would not have been vacant without the branch target buffer 693.

Referring to FIG. 2 for another illustration, assume storage elements 503*a–d* contain a first set of four instructions (the "jump" instruction being in storage element 503*c*), and assume storage elements 503*e–g* are vacant. The fourth instruction in storage element 503*d* is treated as a vacancy so that a four element vacancy exists in storage elements 503*d–g*.

Along with the prediction from branch target buffer 693 that the instruction in storage element 503*c* is a jump, a predicted target address is supplied to the instruction buffer 601 via line 208. In the next cycle, the instruction buffer 601 uses the predicted target address as a specific fetch address, and sets the lowest two bits to "00" to form a general fetch address. The general fetch address is then fed via line 203 to the cache memory 201, so that the cache memory 201 can feed the instruction buffer 601 a second set of four instructions beginning with the address equal to the general fetch address.

The instruction buffer 601 disregards any instructions immediately proceeding the target instruction in the second set of four instructions. Thus, if the target instruction is the third instruction of the second set of four instructions, the instruction buffer 601 will disregard the first and second instructions in the second set of four instructions (i.e., treat them as vacancies). Referring again to FIG. 2, the vacancy of storage elements 503*d–g* exists for input of the second set of four instructions. The instruction buffer 601 treats the first and second instructions in the second set of four instructions as vacancies, and thus places the third and fourth instructions (the third instruction being the target instruction) into storage elements 503*d* and 503*e*, respectively. Two vacancies exists in storage elements 503*f–g*.

Turning to FIG. 6, one, two, three, or four 32 bit instructions are fed from the instruction buffer 601 to the instruction decoder 695 via a 128-bit line 699. The two addresses of the 32 bit instructions (one address corresponding to each general fetch address, or to each set of instructions) are fed from the instruction buffer 601 to the instruction decoder 695 via a 132-bit line 711. The 132 bits represent the 128 bits used by the two 64 bit general fetch addresses and the 8 bits used by the four two bit address codes. The two bit address codes are not decoded by the instruction decoder 695, but may be used by the execution unit 703 to regenerate instruction addresses.

Additionally, for each of the four potential instructions, an extra bit is used. The 4 bit line 713 carries these bits from the state machine 691 of the instruction buffer 601 to the instruction decoder 695. Each bit conveys whether its corresponding instruction is from the first general fetch address or from the second general fetch address. The instruction decoder 695 decodes the instructions and feeds them to execution unit 703, where the instructions are executed.

As a last note, the instruction buffer 601 of the present invention can be configured to input less than four instructions per cycle. Turning back to FIG. 2, assume that a first set of four instructions includes a jump that is predicted taken. Assuming that this predicted jump is placed in storage element 503*a*, then the other three instructions would not be placed in storage elements 503*b–d*. Alternatively, if this predicted jump were placed in storage element 503*c*, then the last instruction would not be placed in storage element 503*d*.

As another example, assume an instruction from a first set of four instructions is in 503*a*. A second set of four instructions having a predicted jump as the second of the four instructions is to be placed in the instruction buffer 601. The first instruction and the predicted jump instruction would be placed in storage elements 503*b* and 503*c*, respectively. The third and fourth instructions of the second set of four instructions may be placed into storage elements 503*d* and 503*e* with their corresponding valid bits not set, or may not be input into storage elements 503*d* and 503*e* at all.

Whereas many alterations and modifications of the present invention will no doubt become apparent to a person of ordinary skill in the art after having read the foregoing description, it is to be understood that the particular embodiments shown and described by way of illustration are in no way intended to be considered limiting. For example, although this disclosure shows an implementation which uses four aligned latches 605, 607, 609, and 611 between the bus 603 and the seven multiplexers 627–639 (see FIG. 3), additional aligned latches may be used if needed for higher latency periods. The additional sets of four aligned latches may be configured as a first-in-first-out (FIFO) chain of buffers. Alternatively, in the case of a total of eight latches, for example, four multiplexers may be used— one for each of the two latches. An additional address buffer, similar to address buffer 703, would be needed for each additional set of four aligned latches. Other implementations of the present invention may be adapted for different systems; for example, an instruction buffer having different length instructions and/or different bit address code lengths or types could be constructed. Therefore, reference to the details of the presently preferred embodiment are not intended to limit the scope of the claims which themselves recite only those features regarded as essential to the invention.

I claim:

1. An instruction buffer connected to an instruction decoder for issuing instruction sets to said instruction decoder, comprising:

first, second, third, and fourth inputs, each for connecting said instruction buffer to a bus and for accepting one of four instructions from said bus;

first means for receiving an instruction from said first input and for latching that instruction as a first output;

second means for selecting an instruction from said first input, said second input and said first output, and for latching that selected instruction as a second output;

third means for selecting an instruction from said first input, said second input, said third input, said first output and said second output, and for latching that selected instruction as a third output;

fourth means for selecting an instruction from said first input, said second input, said third input, said fourth input, said first output, said second output and said third output, and for latching that selected instruction as a fourth output;

fifth means for selecting an instruction from said second input, said third input, said fourth input, said first output, said second output, said third output and said fourth output, and for latching that selected instruction as a fifth output;

sixth means for selecting an instruction from said third input, said fourth input, said second output, said third output, said fourth output and said fifth output, and for latching that selected instruction as a sixth output; and seventh means for selecting an instruction from said fourth input, said third output, said fourth output, said fifth output and said sixth output, and for latching that selected instruction as a seventh output.

2. The instruction buffer according to claim 1, wherein said fourth, said fifth, said sixth, and said seventh outputs are connected to said instruction decoder.

3. An instruction buffer for issuing instructions, comprising:

a first storage area comprising a first predetermined number of storage elements;

a second storage area comprising a second predetermined number of storage elements;

means for loading a first number of instructions into said first storage area, said first number of instructions being equal to said first predetermined number;

means for issuing a second number of instructions concurrently from said first storage area, said second number of instructions being variable between zero and a sum of said first predetermined number and said second predetermined number;

means for sensing said second number of instructions;

means for shifting instructions in said first and said second storage areas in a direction from said second storage area to said first storage area according to said second number of instructions;

means for determining, based on said second number of instructions, whether said first number of instructions should be loaded into said second and said first storage areas;

means for loading said first number of instructions into said second and said first storage areas, upon a determination that said second and said first storage areas should be loaded;

seven valid bits;

wherein said first predetermined number is equal to four and said second predetermined number is equal to three; and wherein said means for determining whether said first number of instructions should be loaded into said second and said first storage areas includes means for determining:
(1) whether four consecutive valid bits are not set; and
(2) whether there is only one set of four instructions in said instruction buffer.

4. An instruction buffer for issuing instruction sets in combinations of one, two, three or four instructions per cycle, comprising:

a bus for providing four instructions;

first, second, third, and fourth lines connected to said bus, each for accepting a corresponding one of the four instructions from said bus;

a first buffer connected to said first line;

a second buffer connected to said first and said second lines and to said first buffer;

a third buffer connected to said first, said second and said third lines, and to said first and said second buffers;

a fourth buffer connected to said first, said second, said third and said fourth lines, and to said first, said second and said third buffers;

a fifth buffer connected to said second, said third and said fourth lines, and to said first, said second, said third and said fourth buffers;

a sixth buffer connected to said third and said fourth lines, and to said second, said third, said fourth and said fifth buffers; and a seventh buffer connected to said fourth line, and to said third, said fourth, said fifth and said sixth buffers.

5. A system for executing computer instructions, comprising:

means for the input of a block of said computer instructions into said system;

a main memory for storing said block of said computer instructions;

a cache memory connected to said main memory for receiving segments of said block of said computer instructions;

an instruction buffer connected to said cache memory for receiving said computer instructions from said cache memory, wherein said instruction buffer includes, first, second, third, and fourth inputs, each for accepting one of four instructions from said cache memory, first means for receiving an instruction from said first input and for latching that instruction as a first output, second means for selecting an instruction from said first input, said second input and said first output, and for latching that selected instruction as a second output, third means for selecting an instruction from said first input, said second input, said third input, said first output and said second output, and for latching that selected instruction as a third output, fourth means for selecting an instruction from said first input, said second input, said third input, said fourth input, said first output, said second output and said third output, and for latching that selected instruction as a fourth output, fifth means for selecting an instruction from said second input, said third input, said fourth input, said first output, said second output, said third output and said fourth output, and for latching that selected instruction as a fifth output, sixth means for selecting an instruction from said third input, said fourth input, said second output, said third output, said fourth output and said fifth output, and for latching that selected instruction as a sixth output, and seventh means for selecting an instruction from said fourth input, said third output, said fourth output, said fifth output and said sixth output, and for latching that selected instruction as a seventh output;

an instruction decoder connected to said instruction buffer for accepting said computer instructions from said instruction buffer and for decoding said computer instructions; and an execution unit connected to said instruction decoder for accepting said computer instructions from said instruction buffer and for executing said computer instructions.

* * * * *